United States Patent
Guering et al.

(10) Patent No.: US 8,544,795 B2
(45) Date of Patent: Oct. 1, 2013

(54) ITEM OF AIRCRAFT GALLEY FURNITURE AND AIRCRAFT COMPRISING SUCH AN ITEM OF FURNITURE

(75) Inventors: Bernard Guering, Montrabe (FR); Jonathan Guering, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 690 days.

(21) Appl. No.: 12/664,408

(22) PCT Filed: Jun. 12, 2008

(86) PCT No.: PCT/FR2008/051046
§ 371 (c)(1),
(2), (4) Date: Dec. 14, 2009

(87) PCT Pub. No.: WO2009/004217
PCT Pub. Date: Jan. 8, 2009

(65) Prior Publication Data
US 2010/0181425 A1 Jul. 22, 2010

(30) Foreign Application Priority Data
Jun. 15, 2007 (FR) .................................... 07 04309

(51) Int. Cl.
*B64D 11/04* (2006.01)
(52) U.S. Cl.
USPC ...................................................... 244/118.5
(58) Field of Classification Search
USPC .................................. 244/118.5, 121, 129.5
See application file for complete search history.

(56) References Cited

U.S. PATENT DOCUMENTS

| | | | |
|---|---|---|---|
| 2,396,039 A * | 3/1946 | Burton et al. | 244/118.1 |
| 6,474,599 B1 * | 11/2002 | Stomski | 244/118.5 |
| 7,014,148 B2 * | 3/2006 | Dominguez | 244/118.5 |
| 2003/0066931 A1 | 4/2003 | Ward | |
| 2004/0094667 A1 * | 5/2004 | D'Alvia | 244/118.5 |
| 2004/0200931 A1 | 10/2004 | Sanford | |
| 2004/0251384 A1 | 12/2004 | Sprenger | |
| 2005/0056727 A1 | 3/2005 | Gonzalez | |
| 2005/0230550 A1 | 10/2005 | Dominguez | |
| 2006/0169840 A1 * | 8/2006 | French et al. | 244/118.5 |
| 2006/0284013 A1 | 12/2006 | Guering | |
| 2008/0164377 A1 * | 7/2008 | Lautridou et al. | 244/229 |
| 2009/0159743 A1 | 6/2009 | Guering et al. | |

FOREIGN PATENT DOCUMENTS

| | | |
|---|---|---|
| CN | 1405062 A | 3/2003 |
| EP | 1 440 883 | 7/2004 |
| WO | 03 024788 | 3/2003 |
| WO | 03 029077 | 4/2003 |
| WO | WO 2006/128999 A2 | 12/2006 |

OTHER PUBLICATIONS

Office Action issued Oct. 9, 2012, in Japanese Patent Application No. 2010-511704 submitting English translation only.

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

An item of aircraft galley unit separating a cockpit from an insecure zone of the aircraft, including two portions separated from one another by a secure wall, one of the portions being accessible only from the cockpit, the other being accessible only from the insecure zone, a recess being made in the portion of the item of unit accessible from the cockpit.

14 Claims, 5 Drawing Sheets

ITEM OF AIRCRAFT GALLEY FURNITURE AND AIRCRAFT COMPRISING SUCH AN ITEM OF FURNITURE

The invention relates to an aircraft galley unit.

At the present time, the cockpit of the aircraft is isolated from the rest of the aircraft by a secured partition that is provided with a reinforcement. A secured door that is arranged in the partition and makes it possible to access the cockpit can be opened only from inside the cockpit for reasons of security.

During the flight, however, the cockpit crew needs to be provisioned with food and beverages.

To accomplish this, the cockpit crew must open the secured door in order to allow the on-board personnel (flight attendants) to bring food (tray meals) and beverages inside the cockpit.

The temporary opening of the door providing access to the cockpit, even if it is surrounded by maximum precautions, nonetheless constitutes a weak point in the securing process on board aircraft.

This invention thus has as an object an aircraft galley unit separating a cockpit from an unsecured zone of the aircraft, characterized in that it comprises two portions separated from one another by a secured wall, one of the portions being accessible only from the cockpit, the other being accessible only from the unsecured zone, a recess being implemented in the portion of the unit accessible from the cockpit.

By virtue of this unit that serves as a kitchen area, the cockpit crew has access to a zone of the unit stocked with food and beverages, which is isolated and secured as compared with another zone of the unit equipped with food and beverages for the other occupants of the aircraft (commercial flight personnel and passengers).

In this way, the access door to the cockpit no longer needs to be opened in order to provision the pilots and copilots, which also reduces the risks of unauthorized intrusions into the cockpit.

The recess takes into account the limited space available in the cockpit and moreover can be used as relaxation space for the crew.

According to one characteristic, the recess is formed at one of the corners of the unit in order to clear an additional free space for movement of the crew.

Arranged at this location in the unit, the recess offers the crew an enlarged space on the cockpit side, thus facilitating the comings and goings of the on-board personnel.

For example, the recess is arranged at the base of a hatch situated at the floor of the cockpit, this hatch allowing the pilots and copilots to access a level of the aircraft situated below the level at which the cockpit is laid out.

The shape of the recess corresponds, for example, to the volume or to the space requirement necessary for the passage of an individual through the access hatch.

Thus, the recess can, at the base of the unit, assume a corner shape in order to follow the contour of the hatch at least in part and, rising toward the upper portion of the unit, adopt a curved shape that extends above the hatch so as, in a way, to close off the recess.

Furthermore, at a recess implemented in the portion of the unit accessible only from the cockpit, a zone for storage and distribution of food and beverages reserved for the cockpit crew is laid out.

Various equipment items can be usefully provided in this zone (storage space, oven, trash can, refrigerated area . . . ) constituting a kitchen and relaxation area solely for the crew.

According to one characteristic, the unit comprises, in the portion of the unit accessible from the cockpit (secured zone), a movable sink block that can occupy a deployed position for use and a position for storage inside the unit.

Since the sink block is retractable and able to be stored in a housing of the secured zone, it does not generate any additional space requirement when it is not being used.

This block is, for example, mounted pivoting around an axis of articulation parallel to the floor of the cockpit in order to change over from a storage position to a service position and vice versa.

According to one characteristic, the sink block is installed at the recess, for example, in a convertible zone around the latter.

According to one characteristic, in its storage position, the sink block is a one-piece assembly made of two cast parts fastened to one another.

This makes it possible to produce a closed block in simple manner.

Moreover, since the two parts are obtained by casting, the block is easier to manufacture than by stamping.

According to one characteristic, the sink block comprises a plurality of storage spaces thus forming a combined sink-storage space (multifunction block). The storage spaces are, for example, distributed in the block at the periphery of the bowl of the sink.

According to another aspect, the invention also applies to an aircraft comprising a galley unit such as briefly explained above.

Other characteristics and advantaged will become apparent in the course of the description that is going to follow, provided solely by way of non-limitative example and presented with reference to the attached drawings, on which:

Figure 1:
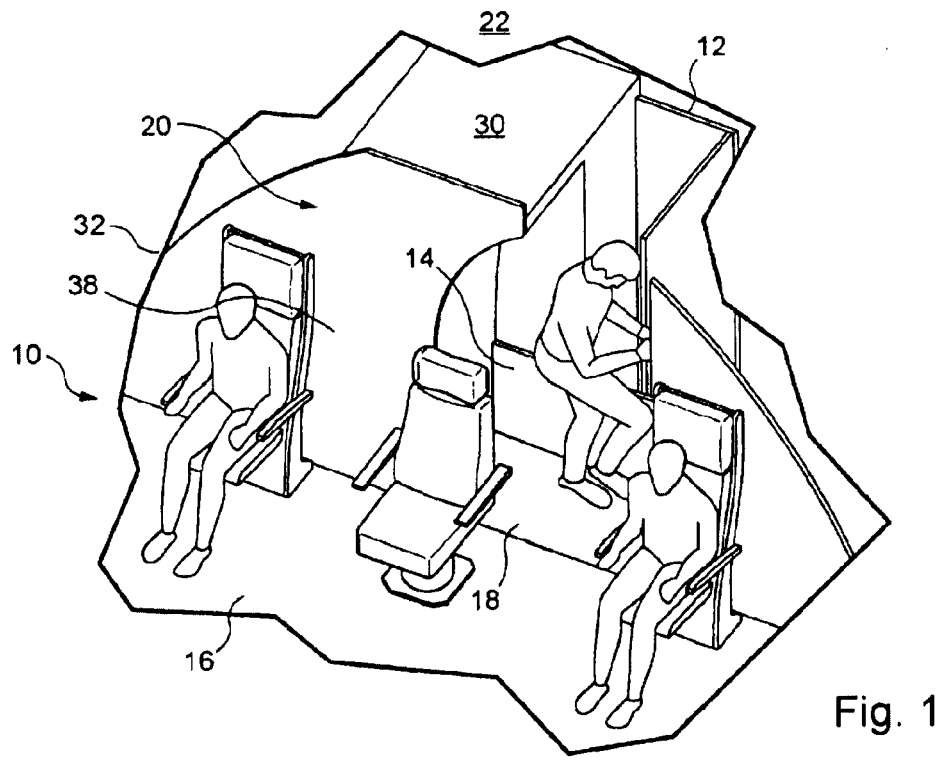
FIG. 1 illustrates schematically and partially in perspective the inside of a cockpit 10 of an aircraft.

The cockpit is separated from the rest of the aircraft, corresponding to an unsecured zone 22, by a door 12 which is reinforced in order to prevent any forced intrusion into the cockpit.

During the flight this door remains continuously closed by virtue of the unit according to the invention which makes it possible to provision the cockpit crew with food and beverages without needing to open the door as in the past.

On FIG. 1, there has been shown a hatch 14 that is laid out at floor 16 of the cockpit in order to allow in particular the passage of the pilot and the copilot from the cockpit to a level 18 below same (for example level of the avionic hold) and vice versa.

Figure 2:
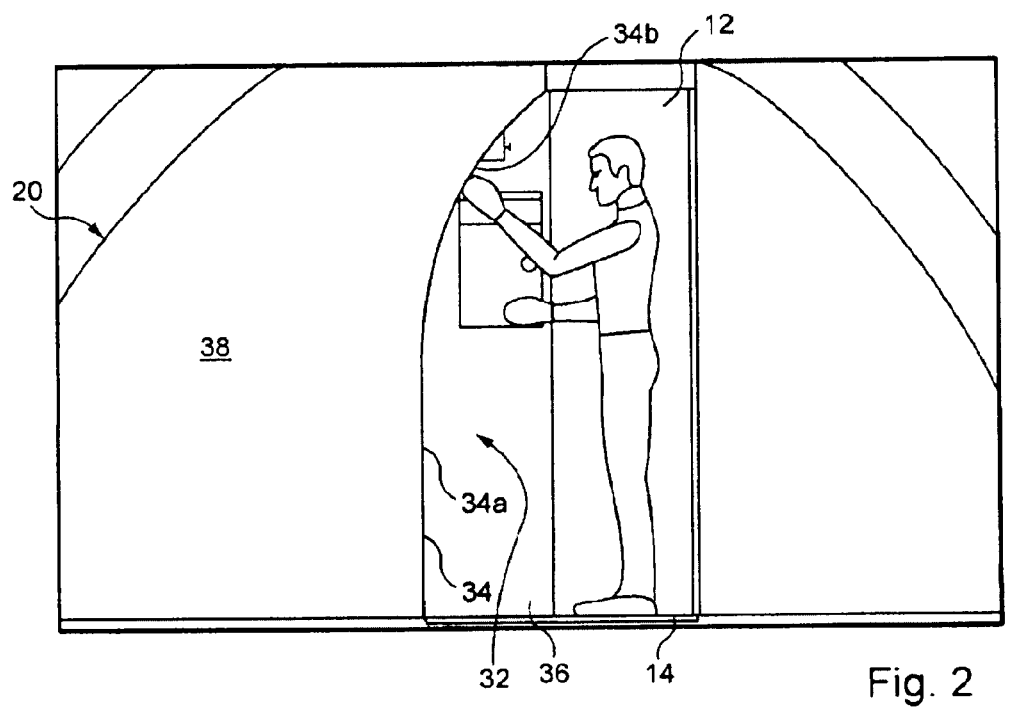
FIG. 2 is a front view of a galley unit 20 from the cockpit.

This access hatch normally is in closed position, that is, arranged just above the wall in the floor of the cockpit as shown on FIG. 2. It appears in open position on FIG. 1 in order to make it possible to see lower level 18 which the crew can access by descending via a ladder and also the space clearance necessary around an individual during his passage from one level to the other.

In the interests of simplification, the ladder used by the individual in FIG. 1 is not shown on this Figure.

A galley (known in English terminology under the name of "galley") unit 20 is arranged between the cockpit and unsecured zone 22 of the aircraft and can be described as a mixed secured galley unit insofar as it serves as a zone for storage and for distribution of food and beverages both for the on-board personnel and the passengers in unsecured zone 22 and for the cockpit crew 10, while observing the security constraints associated with the cockpit.

Figure 3:
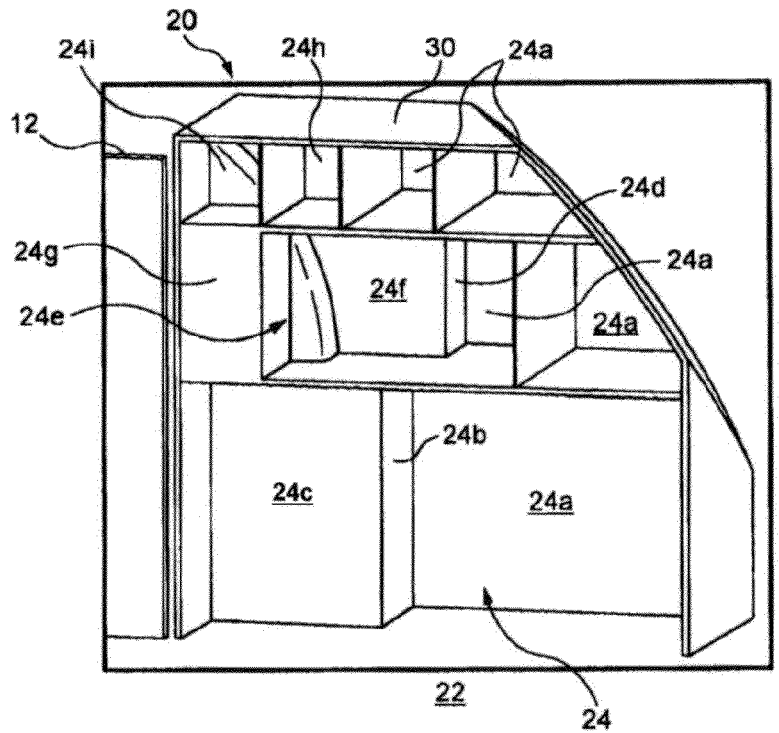
FIG. 3 is a perspective view showing the inside of galley unit 20 such as it is seen from unsecured zone 22.

To accomplish this, a secured wall 24 shown on FIG. 3 separates the portion of unit 20 accessible only from unsecured zone 22 from the portion of the unit accessible only from the cockpit and visible on FIG. 2.

As shown on FIG. 3, the secured wall that comprises in its thickness a reinforcement similar to the one for door 12 is very irregular insofar as it defines numerous recesses and nooks of varied shapes inside the unit.

These recesses serve as storage spaces and are arranged at different heights (levels) of the unit.

Thus, in the lower portion of the unit wall 24 comprises successively, from right to left, a first back wall 24a giving the unit its maximum depth, then a wall 24b forming a setback perpendicular to wall 24a, toward the front of the unit, and a wall 24c parallel to wall 24a and forming the back wall of the unit in this portion thereof.

Wall 24c is situated farther in front than wall 24a in relation to the front face of the unit and the storage space to the right of this wall therefore is less deep.

Figure 4:
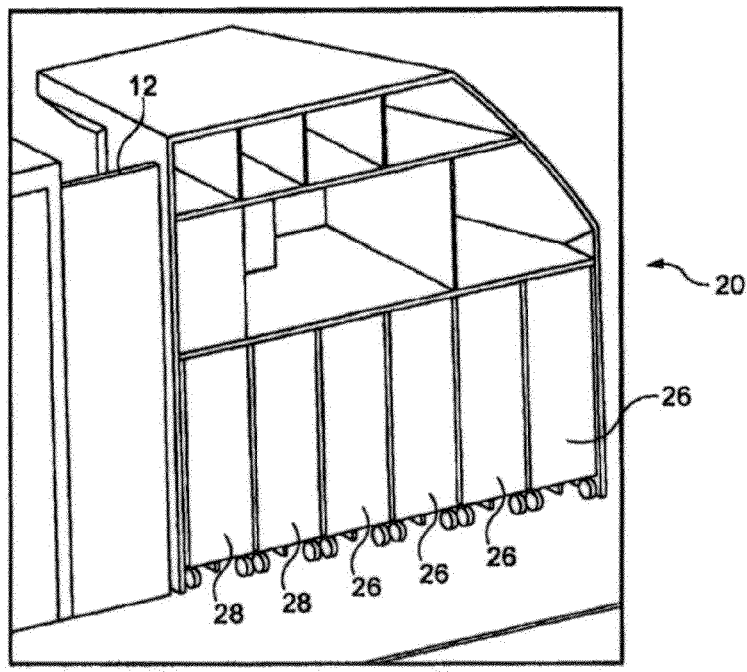
FIG. 4 is a perspective view showing the unit of FIG. 3 containing trolleys for storage and for distribution of foodstuffs to the passengers.

As shown on FIG. 4, carts (known in English terminology under the term "trolleys") are stored in the spaces situated between back walls 24a and 24c and the front face of the unit. Taking into account the differences in depth between the two storage spaces, trolleys 26 of maximum depth are stored facing wall 24a, while in the space opposite wall 24c, trolleys 28 of lesser length are stored (for example a trolley having a length equal to half that of trolleys 26).

At the level of the unit situated above the storage spaces for trolleys for distribution of food and beverages to the passengers, wall 24 is configured differently since two setbacks 24d and 24e are implemented:

setback 24d extends from back wall 24a toward the front to meet a back wall 24f closer to the front face of the unit than back wall 24a and setback 24e at first has a volume form extending toward the front from wall 24f and which is broader at its base than at its upper part, this form being followed by a flat face perpendicular to wall 24f and meeting the front face of the unit where a front face wall 24g is arranged.

In these various spaces (niches, nooks . . . ), various equipment items such as beverage dispensers and work surfaces also are laid out.

At the upper level (last level), two setbacks also are present, a first flat setback not shown on FIG. 3 (but shown at FIG. 7 with the reference 24j) extends perpendicularly from back wall 24a to then form a back wall 24h and a second volume setback 24i extends from back wall 24h, this setback prolonging the volume form of setback 24e of the lower level toward upper panel 30 forming the top of the unit.

At this upper level various recesses are provided for accommodating therein, for example, drawers for storage of food.

It will be noted that various vertical partitions are provided at the second and third level to define compartments of different shapes and sizes.

As shown on FIGS. 1 and 2, unit 20 has a recess 32 in a portion of this unit that is accessible only from the cockpit.

This recess is formed at one of the corners of this unit that adjoins the aisle situated behind access door 12 on the cockpit side. This zone situated between the door and the seats installed in the cockpit (FIG. 3) generally is cramped and the presence of a recess/clearance in this zone facilitates the movement of individuals. The recess is more specifically formed over only one portion of the depth and, for example, over one portion of the height of the unit.

Recess 32 is implemented, for example, at the base of hatch 14.

The volume of recess 32 is defined in particular by the space needed around an individual who is using the access hatch to descend or ascend.

Thus the geometry of recess 32 is defined by two adjacent walls of the unit, namely walls 34 and 36 that form a right angle and are arranged along two adjacent edges of hatch 14.

Wall 36 is flat vertically from bottom to top while adjacent wall 34 that forms a setback or retreat in relation to wall 38 of unit 20 is flat and vertical in its lower portion 34a halfway up. It then curves gradually rising toward the top of the unit from halfway up so as to form a concave wall 34b seen from the outside of the unit.

FIG. 2 shows the profile of wall 34 and, in particular, the gradually curved upper portion.

Recess 32 thus makes it possible to best adapt to the environment linked to the hatch since it takes on the contour of hatch 14 at the bottom portion and restores the convertible volume of the unit at the top portion, while remaining fully ergonomic.

It will be noted that the curved forms of front panel 34 reappear in the volumes of setbacks 24f and 24i mentioned above in connection with FIG. 3.

It thus is seen that volumes 24f and 24i correspond to portions of the volume of recess 32.

The secured part of the unit bordering recess 32 comprises a convertible secured zone for the cockpit crew that can be used, in particular, for the storage and distribution of food and beverages as will be seen afterwards.

Figure 6:
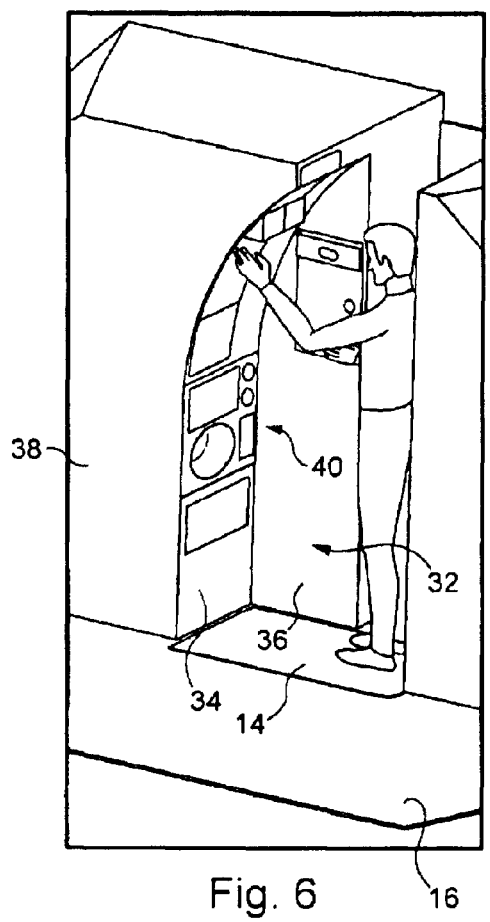
FIGS. 5 and 6 show in perspective the unit in use from the cockpit with sink block 40 in its two extreme positions.
Figure 5:
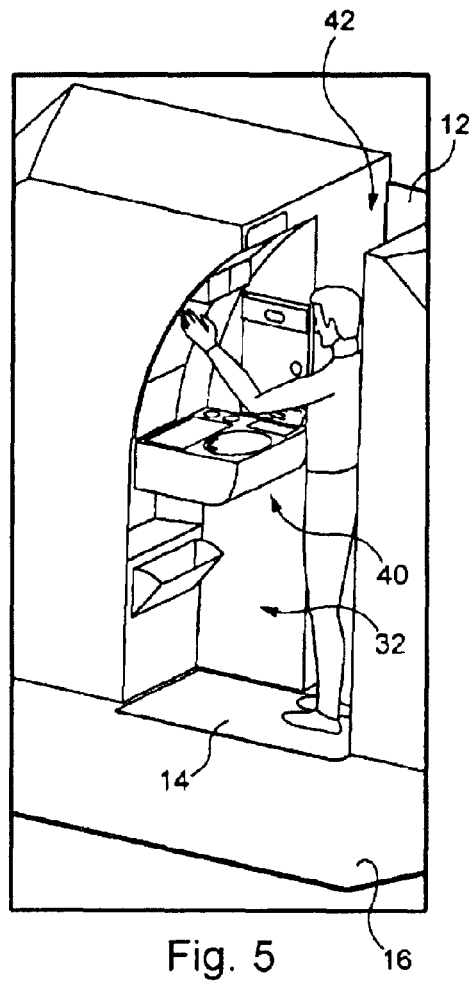

In particular, the zone of the unit surrounding the recess comprises a sink block 40 arranged in relation to wall 34 of the recess and that can be moved between two positions: a deployed use or service position shown at FIG. 5 and a storage position inside the unit, as illustrated on FIG. 6.

By installing the sink block in retractable or folding manner at one of the walls defining the recess, this space thus can be used in optimal manner when the hatch is closed (FIG. 5). The retractable nature of the block also makes it possible not to encroach on the space needed for passage of an individual using access hatch 14 when the latter must be opened.

It will be noted that removable block 40 projects in relation to wall 34 of the unit over a dimension corresponding to the width of wall 36 so as not to encroach on the width of aisle 42 laid out between door 12 of the cockpit and the cockpit itself.

It should be mentioned that recess 32 also is formed set back in relation to the aisle.

Figure 7:
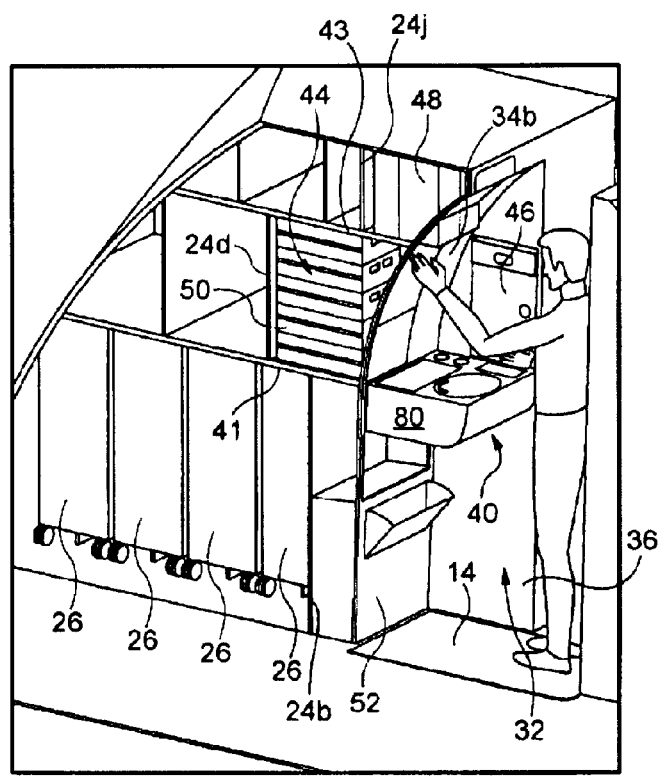
FIGS. 7 and 8 are similar to FIGS. 5 and 6 and show the inside of the unit seen from the cockpit.
Figure 8:
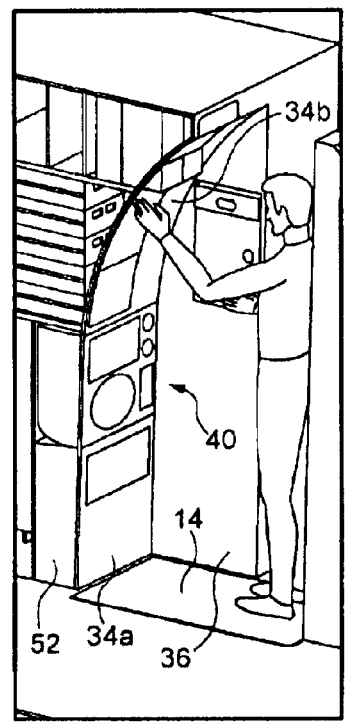

On FIGS. 7 and 8, the sink block has been shown in its two extreme positions, by taking away wall 38 of the unit that closes off the latter on the cockpit side.

On FIG. 7, trolleys 26 of FIG. 4 are shown stored side by side in the available storage space.

It will be noted that wall 38 corresponds in part to secured back wall 24a described with reference to FIG. 3 and that stops at secured walls 24b, 24d and 24j (shown with a double line on this Figure).

Horizontal walls 41 and 43 connecting walls 24b, 24d and 24j to each other also are secured, like the entire boundary separating the portion of the unit accessible from the cockpit from the remainder of the unit.

As partially shown on FIG. 7, reinforced walls 24b, 24d and 24j partially define a convertible zone 44 in the portion of the unit accessible only from the cockpit, and situated at the periphery of recess 32.

It will be noted that the portion of wall 38 that extends beyond walls 24b, 24d, 24j and that closes off zone 44 is not necessarily secured, unless it is easier to manufacture a single entirely secured wall 38.

Walls or portions of walls 24c, 24e, 24f, 24g, 24h and 24i of FIG. 3 also partially define, in cooperation with walls 24b, 24d and 24j, zone 44 on the side of the unit turned toward unsecured zone 22.

Zone 44 surrounding recess 32 on two sides is laid out inside the unit in its secured portion, more or less along an L-shape in a view from above, the 2 branches of the L bordering detachment 32.

Thus there are located in the secured portion of the unit bordering detachment an oven 46, a station 48 for distribution of beverages such as coffee and cool water, a refrigerated storage unit 50, a trash can 52 and the folding sink block 40.

It will be noted that oven 46 is laid out behind wall 36, the front door of the oven being arranged on the wall surface.

As regards retractable sink block 40 and trash can 52, they are arranged behind wall 34 in a housing provided for this purpose, on lower portion 34a, that is, in the zone where wall 34 is flat.

FIG. 8 shows the housing in which sink block 40 is installed in storage position.

It thus is arranged above trash can 52, in this way occupying all the available space between wall 34 and secured rear wall 24b.

Behind curved portion 34b of wall 34 there is located, above the level where sink block 40 is arranged in deployed position, refrigerated unit 50 in which several trays are stacked. These trays occupy almost all the free space between wall 34b and secured back wall 24d.

Furthermore, dispensers 48 are arranged at the upper part of the unit, in a volume that has been made convertible because of the curvature imparted to the upper portion 34b of wall 34.

In this way the available space of secured zone 44 is used optimally.

The bottom portion of dispensers 48 where the pourers or taps are situated project in relation to curved wall 34b in order to facilitate the dispensing of beverages by allowing access to the operators of these equipment items.

Figure 9:
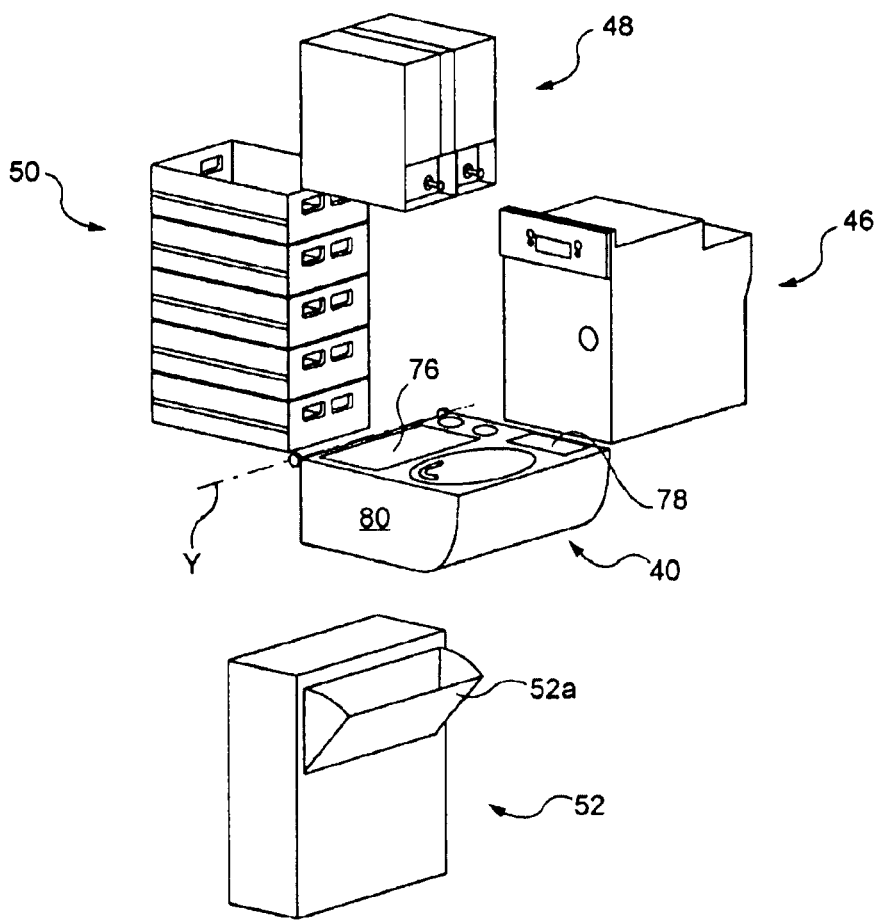
FIG. 9 is an overall schematic view showing, in space, the various equipment items installed in the secured zone of the unit.

These components are shown on FIG. 9, without the unit, so as to illustrate the space requirement generated by these equipment items and their different spatial arrangements in relation to each other.

Figure 10:
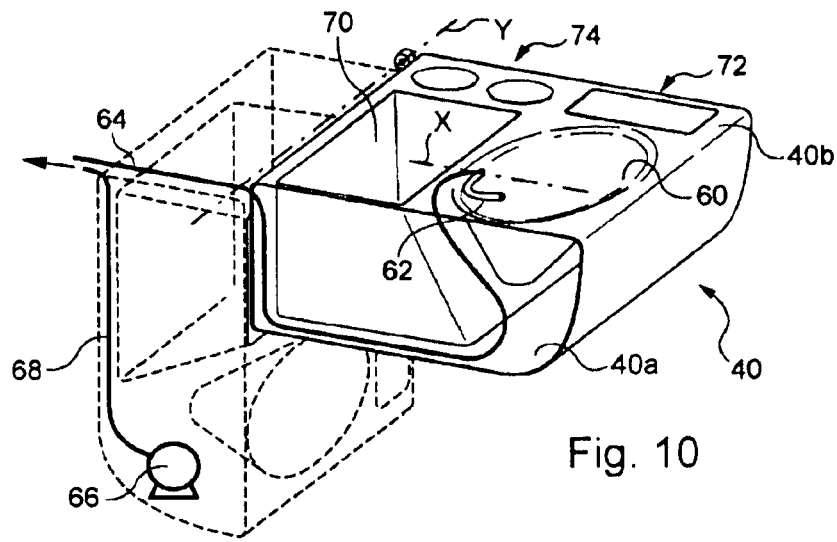
FIG. 10 is an enlarged schematic view showing sink block 40 in its deployed position and in its retracted position.

FIG. 10 schematically illustrates sink block 40 in its two extreme positions along a view in section that shows the inside thereof.

Sink block 40 comprises a receptacle or bowl 60 within which water can flow through a retractable faucet 62 (faucet 62 can change over from the stored horizontal position shown on FIG. 10 to a service position obtained by rotation around a horizontal axis X illustrated schematically on FIG. 10).

It will be noted that in this description the horizontal or vertical positions of the various components arranged on board the aircraft are understood as being respectively parallel or perpendicular to floor 16.

A flexible connection 64, attached to this faucet, passes close to the horizontal axis of articulation Y forming a hinge and around which sink block 40 is mounted pivoting.

The section of FIG. 10 shows a double bottom between the bottom of receptacle 60 and bottom 40a of the sink block in which the water originating from faucet 62 and having flowed into receptacle 60 can be stored temporarily for evacuation thereof.

A pump 62, installed in the lower portion of the sink block, is attached to a connection 68 that allows evacuation of the water as indicated by the arrow.

Evacuation of the water is effected by automatic activation of the pump as soon as the water has flowed out.

It will be noted that, by virtue of the double bottom that retains the liquid, it is not necessary to wait until all the liquid is evacuated in order to swing the block into storage position.

An anti-return safety valve (not shown) is provided in the lower portion of receptacle 60 through which the water flows in order to prevent a return thereof when the sink is swung into its storage position and the water level reaches the plug of the receptacle.

Sink block 40 also comprises a plurality of storage areas 70, 72, 74 built into the block around bowl 60. Among these various storage areas there is a large-sized compartment 70 that takes advantage of the volume inside the sink block defined by back wall 40a and by upper wall 40b constituting a work surface for block 40.

It will be noted that the internal form of storage space 70 is adapted to the internal form of receptacle 60 (following its contour at least in part) in order to lose the least available volume inside the block.

Compartment 70 is equipped with an access hatch 76 the opening of which is secured so that the latter does not open when the block is stored in vertical position.

A second storage compartment 72 is provided in the internal volume of box 40 and also is equipped with a secured hatch 78 for preventing any untimely opening when it is not voluntarily sought.

Several storage spaces 74 that are implemented in the form of hollows of more or less cylindrical shape and provided with a back wall serve, for example, to store cups temporarily when the block is in horizontal position. It will be noted that these pockets are slanted so that, in vertical storage position of the block, the clean or used cups, stacked or otherwise, are slanted upward and not horizontal (easy to grasp, liquid not spilled . . . ).

Sink block 40 constitutes a one-piece assembly made up of two cast parts which then were fastened to one another for example by gluing.

The two parts are an upper part comprising upper wall 40b and various volumes of cast receptacles 70, 72, 74 and a lower part comprising back wall 40a and vertical walls rising toward upper wall 40b but stopping at a distance therefrom at a horizontal joint plane (when the block is pulled out) between the parts. In this way there is obtained a closed block with a used internal volume.

Block 40 thus forms a retractable sink-storage space combination that can be built into types of units other than the one described and shown on the Figures.

It can be used, for example, in other means of transport, vehicles or locomotives such as trains, where space-requirement constraints are present.

It will be noted furthermore that block 40 also comprises a locking system not shown that makes it possible, when the block is in horizontal position, to hold it stably in this position.

For example, it can be a matter of fingers pushed by springs, arranged along the horizontal flanks of the block (one flank 80 is shown on FIGS. 7 and 9) and that engage in the housings of the unit when the block is removed from the unit. An offset lever connected to cables acting on the fingers to retract them outside their housings is activated by a user when the block is to be drawn in.

It will be noted that trash can 52 is provided with an opening 52a oriented upward and which is removable by virtue of a pivoting movement around a horizontal axis.

The invention claimed is:

1. Aircraft galley unit separating a cockpit from an unsecured zone of an aircraft, comprising:
   a first part and a second part separated from one another by a secured wall, the first part of the aircraft galley unit being accessible only from the cockpit, the second part of the aircraft galley unit being accessible only from the unsecured zone, a recess being implemented in the first part of the aircraft galley unit.

2. Aircraft galley unit according to claim 1, wherein the recess is formed at one of the corners of the unit in order to clear an additional free space for movement of the crew.

3. Aircraft galley unit according to claim 1 or 2, wherein a zone for storage and distribution of food and beverages is laid out at the recess.

4. Aircraft galley unit according to claim 1 wherein the first part of the aircraft galley unit includes a movable sink block able to occupy a deployed use position and a storage position inside the unit.

5. Aircraft galley unit according to claim 4, wherein the recess includes the sink block.

6. Aircraft galley unit according to claim 4 wherein the sink block is a one-piece assembly made up of two cast parts fastened to one another.

7. Aircraft galley unit according to claim 4 wherein the sink block comprises a plurality of storage spaces.

8. Aircraft galley unit according to claim 4,
   wherein the recess includes a first wall that is joined to a second wall, and
   wherein the first wall includes the sink block.

9. Aircraft galley unit according to claim 8, wherein the first wall includes a housing that stores the sink block when the sink block is in the storage position.

10. Aircraft galley unit according to claim 8, wherein the first wall includes a lower portion that extends from a floor of the cockpit and an upper portion that extends from the lower portion, the upper portion curving away from the lower portion to define a top of the recess.

11. Aircraft galley unit according to claim 10, wherein the lower portion includes a housing that stores the sink block when the sink block is in the storage position.

12. Aircraft comprising a galley unit according to claim 1.

13. Aircraft according to claim 12, wherein the recess is arranged at the base of a hatch arranged at a floor of the cockpit, and
   wherein the recess allows access to a level of the aircraft situated below a level of the cockpit.

14. Aircraft according to claim 13, wherein a form of the recess corresponds to a volume needed for passage of an individual through the hatch.

* * * * *